US012755401B2

(12) United States Patent
Hong et al.

(10) Patent No.: US 12,755,401 B2
(45) Date of Patent: Oct. 6, 2026

(54) OPTICAL TACTILE SENSOR

(71) Applicant: Samsung Electronics Co., Ltd., Suwon-si (KR)

(72) Inventors: Hyunseok Hong, Suwon-si (KR); Jinpyo Gwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 203 days.

(21) Appl. No.: 18/767,431

(22) Filed: Jul. 9, 2024

(65) Prior Publication Data

US 2024/0362801 A1 Oct. 31, 2024

Related U.S. Application Data

(63) Continuation of application No. PCT/KR2023/000405, filed on Jan. 10, 2023.

(30) Foreign Application Priority Data

Jan. 13, 2022 (KR) ........................ 10-2022-0005109

(51) Int. Cl.
*G06T 7/246* (2017.01)
*B25J 9/16* (2006.01)
(Continued)

(52) U.S. Cl.
CPC ............. *G06T 7/246* (2017.01); *B25J 9/1697* (2013.01); *G01L 1/24* (2013.01); *G06T 1/0014* (2013.01);
(Continued)

(58) Field of Classification Search
None
See application file for complete search history.

(56) References Cited

U.S. PATENT DOCUMENTS

2003/0178556 A1* 9/2003 Tachi ...................... G06F 3/042 250/208.1
2007/0040107 A1* 2/2007 Mizota .................... G01L 5/228 250/221
(Continued)

FOREIGN PATENT DOCUMENTS

CN 109015763 * 12/2018 .............. B25J 19/02
CN 109015763 A 12/2018
(Continued)

OTHER PUBLICATIONS

Extended European Search Report dated Mar. 10, 2025, issued in European Application No. 23740420.7-1001.
(Continued)

*Primary Examiner* — Beniyam Menberu
(74) *Attorney, Agent, or Firm* — Jefferson IP Law, LLP

(57) ABSTRACT

An optical tactile sensor module is provided. The optical tactile sensor includes a housing, an elastic part including a first surface for contacting an object, a plurality of markers disposed at the elastic part and being adjacent to the first surface of the elastic part, and a camera unit configured to capture an image of a movement of at least some of the plurality of the markers on the first surface when the object contacts the first surface of the elastic part, wherein the plurality of markers include a first marker including a first color, and a second marker including a second color different from the first color.

17 Claims, 8 Drawing Sheets

(51) Int. Cl.
*G01L 1/24* (2006.01)
*G06T 1/00* (2006.01)

(52) U.S. Cl.
CPC ............... *G06T 2207/30108* (2013.01); *G06T 2207/30204* (2013.01)

(56) References Cited

U.S. PATENT DOCUMENTS

| | | | | |
|---|---|---|---|---|
| 2007/0043508 | A1* | 2/2007 | Mizota | G01L 1/247 702/19 |
| 2008/0027582 | A1* | 1/2008 | Obinata | B25J 13/084 73/9 |
| 2008/0245955 | A1* | 10/2008 | Tachi | G01L 5/166 250/221 |
| 2020/0018656 | A1 | 1/2020 | Sawada et al. | |
| 2020/0088913 | A1 | 3/2020 | Fukuda | |
| 2021/0389872 | A1 | 12/2021 | Hogan et al. | |
| 2022/0221357 | A1 | 7/2022 | Elias et al. | |

FOREIGN PATENT DOCUMENTS

| | | | | |
|---|---|---|---|---|
| CN | 113892019 | A | 1/2022 | |
| EP | 3693139 | | 8/2020 | |
| JP | 1997-029683 | A | 2/1997 | |
| JP | 2003034005 | * | 2/2003 | B32B 27/20 |
| JP | 2004233298 | * | 8/2004 | G01B 11/16 |
| JP | 2012-042220 | A | 3/2012 | |
| JP | 2018-115923 | A | 7/2018 | |
| JP | 2021154412 | * | 10/2021 | B25J 19/02 |
| KR | 10-8046305 | B1 | 7/2008 | |
| WO | 2018-174164 | A1 | 9/2018 | |
| WO | WO 2020165171 | * | 8/2020 | B25J 13/08 |

OTHER PUBLICATIONS

International Search Report dated Apr. 10, 2023, issued in International Patent Application No. PCT /KR2023/000405.
Korean Office Action dated Jul. 16, 2026, issued in a Korean Patent Application No. 10-2022-0005109.

* cited by examiner

OPTICAL TACTILE SENSOR

CROSS-REFERENCE TO RELATED APPLICATION(S)

This application is a continuation application, claiming priority under § 365 (c), of an International application No. PCT/KR2023/000405, filed on Jan. 10, 2023, which is based on and claims the benefit of a Korean patent application number 10-2022-0005109, filed on Jan. 13, 2022, in the Korean Intellectual Property Office, the disclosure of which is incorporated by reference herein in its entirety.

BACKGROUND

1. Field

The disclosure relates to an optical tactile sensor. More particularly, the disclosure relates to a tactile sensor used in a robot hand.

2. Description of Related Art

A tactile sensor is useful for detecting, recognizing, and/or manipulating objects and is based on contact between the object and the sensor. An optical tactile sensor (OTS) is a tactile sensor that uses a camera to capture the type of contact and slippage between an object and the sensor. For example, a camera-based optical tactile sensor (OTS) may measure the displacement of an elastic part (e.g., gel) and a plurality of markers due to contact with an object using a camera, thereby measuring the force applied to the elastic part.

More particularly, as the need to stably grasp or release various objects with a robot hand increases, there is an increasing need for the optical tactile sensor to precisely measure the magnitude of force and measure the angles of various forces in order to realize, in the robot hand, the contact information obtained using the fingers when a person grasps an object. Camera-based optical tactile sensors (OTSs) may include a function of capturing external images using a camera in addition to the force measurement.

The above information is presented as background information only to assist with an understanding of the disclosure. No determination has been made, and no assertion is made, as to whether any of the above might be applicable as prior art with regard to the disclosure.

SUMMARY

In general, when capturing an external image using an optical tactile sensor (OTS), if the colors of the object and captured image are similar to the color of the marker, it is difficult to measure the displacement of the marker.

Aspects of the disclosure are to address at least the above-mentioned problems and/or disadvantages and to provide at least the advantages described below. Accordingly, an aspect of the disclosure is to provide an optical tactile sensor that is configured as markers including a plurality of colors and is able to accurately measure the displacement of the marker when capturing an external image.

Additional aspects will be set forth in part in the description which follows and, in part, will be apparent from the description, or may be learned by practice of the presented embodiments.

In accordance with an aspect of the disclosure, an optical tactile sensor module is provided. The optical tactile sensor includes a housing, an elastic part including a first surface for contacting an object, a plurality of markers disposed at the elastic part and being adjacent to the first surface of the elastic part, and a camera unit configured to capture an image of a movement of at least some of the plurality of the markers first surface to measure a magnitude of force generated upon contact with the object, wherein the plurality of markers include a first marker including a first color, and a second marker including a second color different from the first color.

In accordance with another aspect of the disclosure, an electronic device is provided. The electronic device includes an optical tactile sensor module, and a circuit board electrically connected to the optical tactile sensor module, wherein the optical tactile sensor module includes a housing, an elastic part including a first surface for contacting an object, a plurality of markers arranged on the first surface of the elastic part, and a camera unit configured to capture an image of a movement of at least some of the plurality of the markers when the object contacts the first surface of the elastic part, and wherein the plurality of markers include a first marker including a first color, and a second marker including a second color different from the first color.

According to various embodiments of the disclosure, the marker includes a plurality of markers having a plurality of colors. When an external object and markers are displayed to overlap on the image captured by the camera unit, even if at least some colors of the captured image are similar to at least one color of the markers, it is possible to easily distinguish between the external object and the markers, and to easily measure the displacement and movement of the marker.

According to various embodiments of the disclosure, at least some of the markers of the optical tactile sensor use thermosensitive pigments. Therefore, the colors of the markers using thermosensitive pigments change into a plurality of colors depending on a plurality of measurable temperature ranges. The optical tactile sensor measures the temperature of an external object when it approaches, and identifies whether or not it is in contact with the external object and the contact area thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
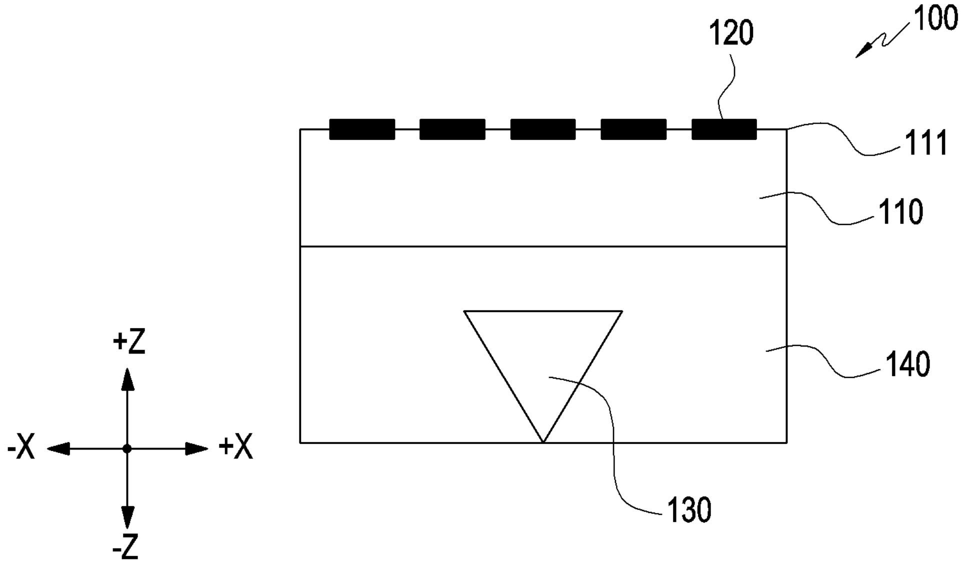
FIGS. 1A and 1B are side views schematically illustrating an optical tactile sensor module according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1B:
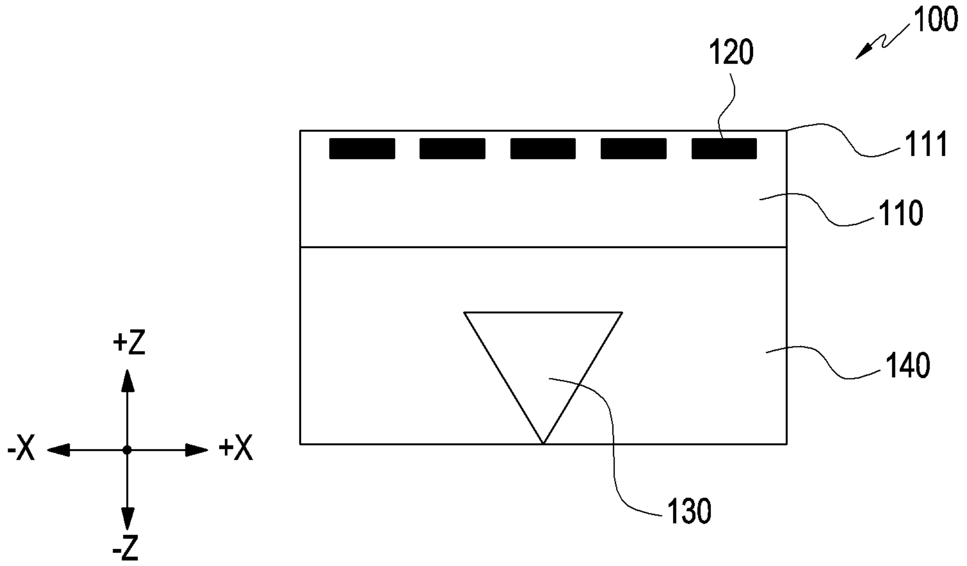

FIGS. 1A and 1B are side views schematically illustrating an optical tactile sensor module according to various embodiments of the disclosure.

Figure 2:
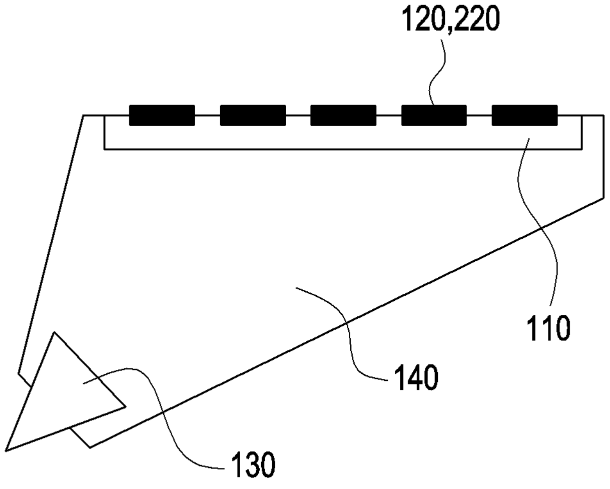
FIG. 2 is a side view schematically illustrating an optical tactile sensor module according to an embodiment of the disclosure.

FIG. 2 is a side view schematically illustrating an optical tactile sensor module according to an embodiment of the disclosure.

Figure 3:
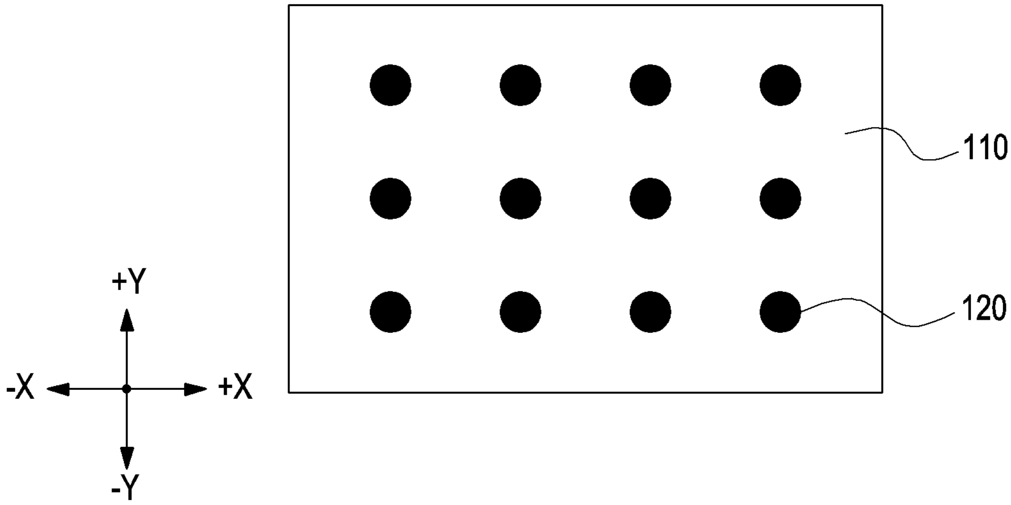
FIG. 3 is a diagram illustrating an elastic part viewed from a camera unit and general markers arranged at the elastic part according to a general optical tactile sensor module according to an embodiment of the disclosure.

FIG. 3 is a diagram illustrating an elastic part viewed from a camera unit and general markers arranged at the elastic part according to a general optical tactile sensor module according to an embodiment of the disclosure.

Figure 4A:
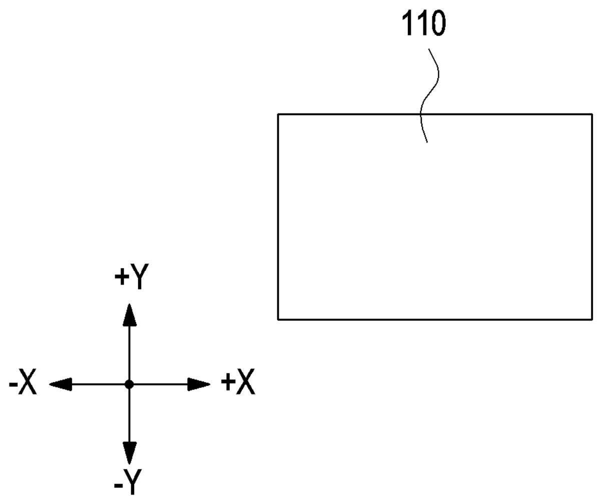
FIG. 4A is a diagram illustrating an elastic part, which does not include general markers, viewed from a camera unit according to a general optical tactile sensor module according to an embodiment of the disclosure.
Figure 4B:
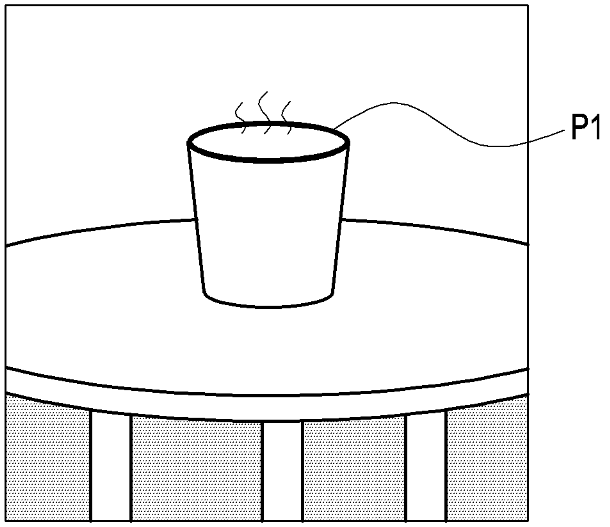
FIG. 4B is a diagram illustrating an image captured by a camera unit in a case of FIG. 4A according to an embodiment of the disclosure.

FIG. 4A is a diagram illustrating an elastic part, which does not include a general marker, viewed from a camera unit according to a general optical tactile sensor module according to an embodiment of the disclosure. FIG. 4B is a diagram illustrating an image captured by a camera unit in the case of FIG. 4A according to an embodiment of the disclosure.

Figure 5A:
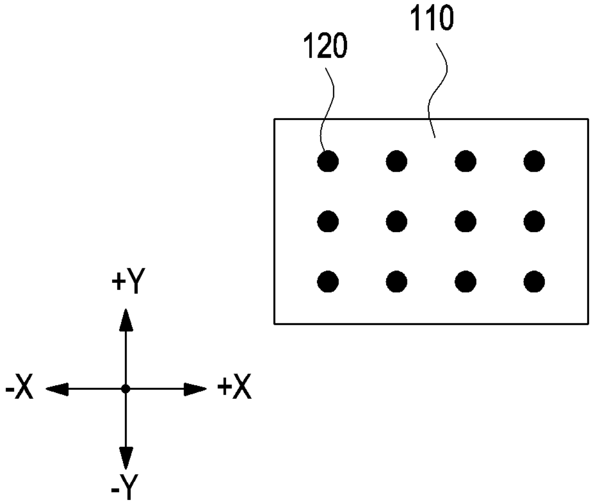
FIG. 5A is a diagram illustrating an elastic part viewed from a camera unit and markers according to an embodiment of the disclosure.
Figure 5B:
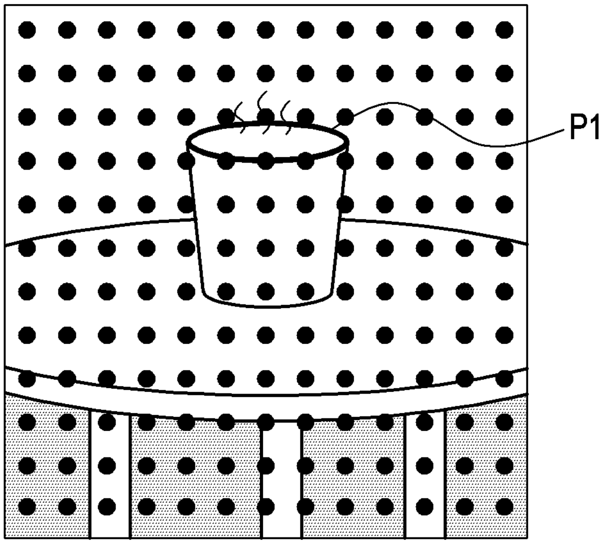
FIG. 5B is a diagram illustrating an image captured by a camera unit in a case of FIG. 5A according to an embodiment of the disclosure.

FIG. 5A is a diagram illustrating an elastic part viewed from a camera unit and markers according to an embodiment of the disclosure. FIG. 5B is a diagram illustrating an image captured by a camera unit in the case of FIG. 5A according to an embodiment of the disclosure.

Referring to FIGS. 1A, 1B, 2, 3, 4A, 4B, 5A, and 5B, an optical tactile sensor module 100 may include an elastic part 110, general markers 120, a camera unit 130, and a housing 140.

In FIGS. 1A, 1B, 2, 3, 4A, 4B, 5A, and 5B, "X" may indicate the longitudinal direction of the optical tactile sensor module 100. "Y" may indicate the width direction of the optical tactile sensor module 100. "Z" may indicate the thickness direction of the optical tactile sensor module 100. Additionally, in an embodiment of the disclosure, "+X" may indicate the right direction of the optical tactile sensor module 100, and "−X" may indicate the left direction of the optical tactile sensor module 100. In an embodiment of the disclosure, "+Y" may indicate the forward direction of the optical tactile sensor module 100, and "−Y" may indicate the backward direction of the optical tactile sensor module 100. In an embodiment of the disclosure, "+Z" may indicate the upward direction of the optical tactile sensor module 100, and "−Z" may indicate the downward direction of the optical tactile sensor module 100.

According to various embodiments of the disclosure, the optical tactile sensor module 100 may identify an external object (e.g., an external object P1 in FIG. 4B) near the optical tactile sensor module 100, measure the temperature of the external object, and obtain tactile information of the external object (e.g., the external object P1 in FIG. 4B).

According to an embodiment of the disclosure, the optical tactile sensor module 100 may be electrically and/or physically connected to another external device (e.g., an industrial robot) through a connection part (not shown). The optical tactile sensor module 100 may be controlled by a connected external electronic device (e.g., an industrial robot). For example, the positional movement of the optical tactile sensor module 100 or the internal operation of the optical tactile sensor module 100 may be controlled by an electrical signal from the connected external electronic device. For example, the optical tactile sensor module 100 may obtain tactile information when an industrial robot grasps an object using a hand mounted to the industrial robot. In addition, the industrial robot may identify an external object approaching the optical tactile sensor module 100 and measure the temperature thereof using the optical tactile sensor module 100, and may grab the object, thereby obtaining tactile information about the object. A circuit board may be electrically connected to the camera unit 130. In addition, a processor may be programmed to process image information obtained by the camera unit 130. In another embodiment of the disclosure, the optical tactile sensor module 100 may be connected to a power source provided in the external electronic device or a processor of the external electronic device. According to an embodiment of the disclosure, the optical tactile sensor module 100 may include an internal power source or may be operated by being connected to an external power source. However, the external electronic device is not limited to the industrial robot and may have various design changes.

According to various embodiments of the disclosure, the elastic part 110 may be formed of an elastic material. For example, the optical tactile sensor module 100 may come into contact with an external object (e.g., the external object P1 in FIG. 4B) through the elastic part 110 and obtain tactile information of the object. According to various embodiments of the disclosure, the elastic part 110 may be formed of an optically transparent elastic material (e.g., gel). For example, although it is made of a silicone resin, such as silicone rubber, the elastic body may be made of any optically transparent material suitable therefor, such as other types of rubber and elastomers. According to various embodiments of the disclosure, a first surface 111 of the elastic part 110 may be optically translucent.

According to various embodiments of the disclosure, the general markers 120 may be disposed adjacent to the first surface 111 of the elastic part 110. According to an embodiment of the disclosure, the general markers 120 may be disposed on the first surface 111 of the elastic part 110. For example, they may be printed on the elastic part 110. According to another embodiment of the disclosure, the general markers 120 may be disposed inside the elastic part 110. However, the position of the elastic part 110 is not limited to the above embodiment of the disclosure, and may be designed in various ways. Referring to FIG. 3, the general markers 120 may include a plurality of markers arranged at regular intervals. The plurality of markers may be arranged side by side on the same plane (e.g., the XY plane in FIG. 3). For example, when the elastic part 110 is viewed from the camera unit 130, the markers 120 including a plurality of markers be arranged at regular intervals inside the elastic part 110 along the X and Y axes. According to various embodiments of the disclosure, the markers 120 may include circular markers. According to an embodiment of the disclosure, the arrangement of the plurality of markers 120 may not be regular. In the case where a sensor, which detects the movement of the plurality of markers 120, detects the positions of the plurality of markers 120, the arrangement of the plurality of markers 120 may be designed in various ways.

According to various embodiments of the disclosure, the camera unit 130 may photograph the elastic part 110 and the movement of the general marker 120 according to contact with an external object. For example, the movement of the marker may include at least one of displacement, deformation, and tilt of the marker. According to various embodiments of the disclosure, in the case where the elastic part 110 is transparent or translucent, the external object P1, as well as the markers 120, may be shown on the captured image of the camera unit 130.

According to various embodiments of the disclosure, the camera unit 130 may be disposed to face in the upward direction (e.g., the +Z direction in FIGS. 1A and 1B), spaced a predetermined distance apart from the elastic part 110, and positioned on the opposite side of the side of the elastic part 110 to which external pressure is applied. According to an embodiment of the disclosure, the camera unit 130 may be located at the center of the elastic part 110, based on the XY plane. According to another embodiment of the disclosure, as shown in FIG. 2, the camera unit 130 may be located on one side of the elastic part, based on the XY plane. However, the position of the camera unit 130 is not limited to the above embodiment and may be designed in various ways depending on the sizes or arrangement relationship of surrounding structures.

According to various embodiments of the disclosure, the camera unit 130 may be a digital camera, that is, a camera for outputting image data as an electrical signal. For example, it may be a charge-coupled device (CCD) camera. However, the camera unit 130 of the disclosure is not limited to the CCD camera, and for example, a digital camera using a complementary metal oxide semiconductor (C-MOS)-type image sensor may be used.

According to various embodiments of the disclosure, the housing 140 may constitute at least a portion of the exterior of the optical tactile sensor module 100 and fix the positions of the elastic part 110 and the camera unit 130. At least a portion of the housing 140 may be in contact with at least a portion of the elastic part 110. For example, at least a portion of the housing 140 may be in contact with one surface facing in a direction (e.g., the –Z direction in FIGS. 1A and 1B) opposite the direction in which the first surface 111 of the elastic part 110 faces. According to an embodiment of the disclosure, referring to FIGS. 1A and 1B, the housing 140 may be configured as one surface perpendicular and/or horizontal to the first surface 111 of the elastic part 110. According to another embodiment of the disclosure, referring to FIG. 2, the housing 140 may include one surface inclined at a specified angle with the first surface 111 of the elastic part 110. However, the shape of the housing 140 is not limited to the above embodiment and may be designed in various ways depending on the sizes or arrangement relationship of surrounding structures. According to various embodiments of the disclosure, referring to FIG. 4B, if the external object P1 approaches the first surface of the elastic part 110, the external object may be displayed on the image captured by the camera unit 130. In general, referring to FIG. 5B, in the case of the general optical tactile sensor module 100 including the general markers 120 and the elastic part 110, the external object and the general markers 120 may be displayed to overlap each other on the image captured by the camera unit 130. In this case, if at least some colors of the captured image are similar to the colors of the general markers 120, it may be difficult to measure the displacement and movement of the general markers 120. For example, in the case where the general markers 120 are black, if at least a portion of the captured image has a dark color similar to the color of the general marker 120, it may be difficult to measure the displacement of the marker. For example, in the case where the general markers 120 are black, if the external object P1 and/or at least a portion of the scene displayed on the captured image of the camera unit 130 has a dark color similar to the color of the marker 120, it may be difficult to measure the displacement of the marker.

Figure 6:
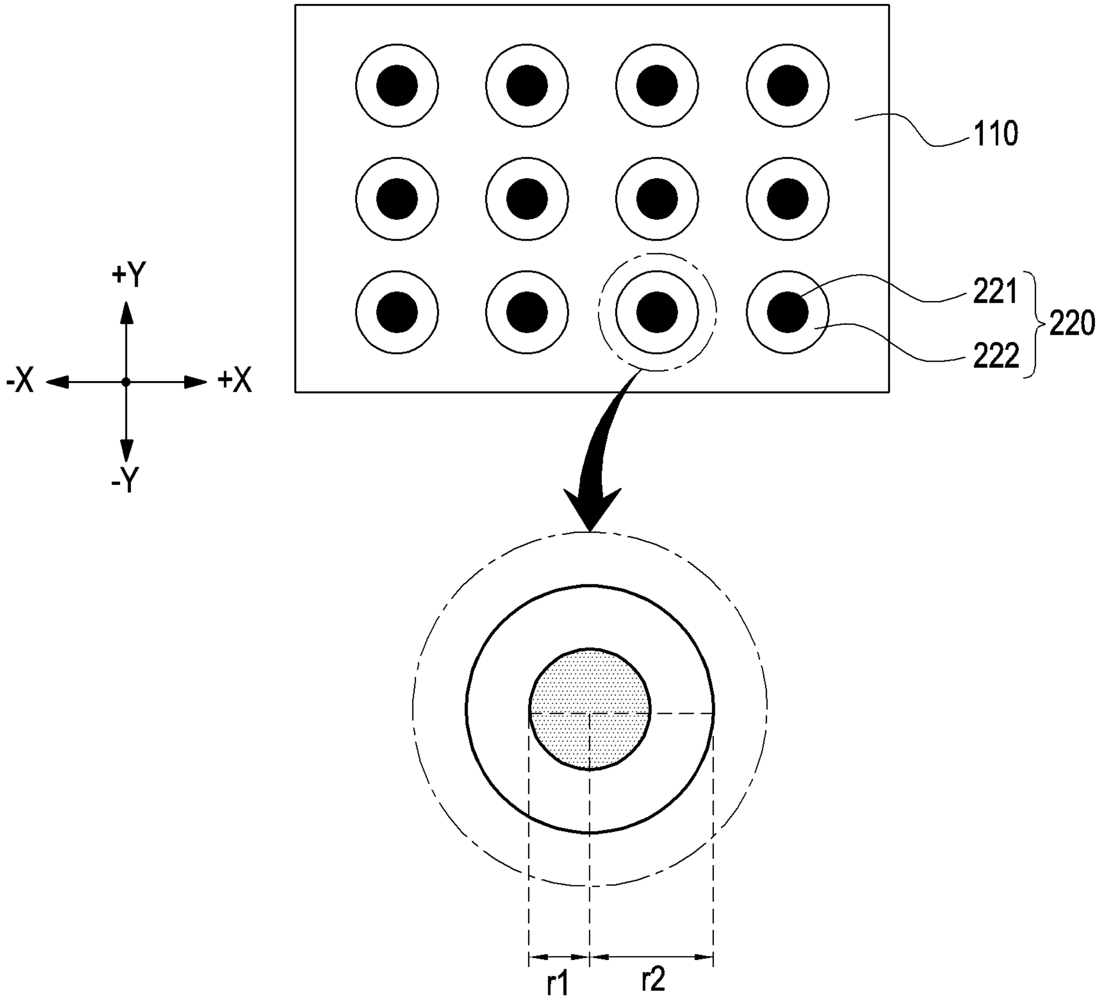
FIG. 6 is a diagram illustrating an elastic part viewed from a camera unit and markers disposed on the elastic part according to an embodiment of the disclosure.

FIG. 6 is a diagram illustrating an elastic part viewed from a camera unit and markers disposed on the elastic part according to an embodiment of the disclosure.

Figure 7A:
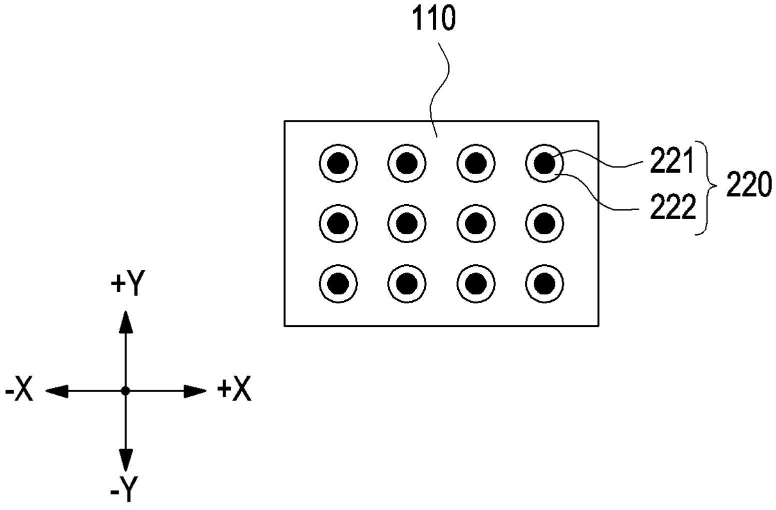
FIG. 7A is a diagram illustrating an elastic part viewed from a camera unit and markers according to an embodiment of the disclosure.
Figure 7B:
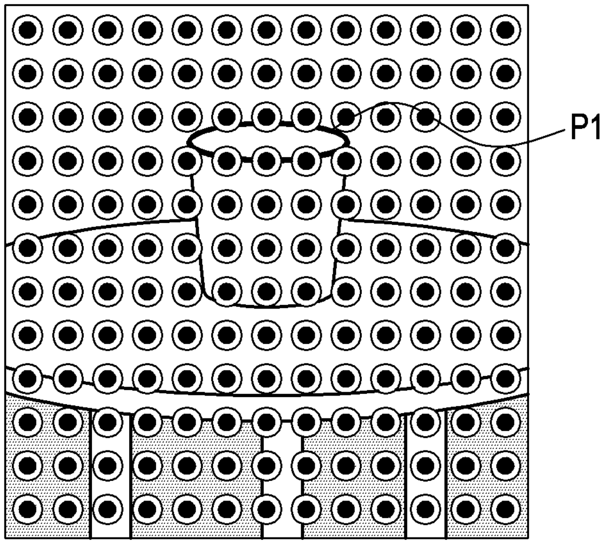
FIG. 7B is a diagram illustrating an image captured by a camera unit in case of FIG. 7A according to an embodiment of the disclosure.

FIG. 7A is a diagram illustrating an elastic part viewed from a camera unit and markers according to an embodiment of the disclosure. FIG. 7B is a diagram illustrating an image captured by a camera unit in a case of FIG. 7A according to an embodiment of the disclosure.

Referring to FIGS. 6, 7A, and 7B, the optical tactile sensor module 100 may include an elastic part 110, markers 220, a camera unit 130, and a housing 140.

The configurations of the elastic part 110, markers 220, camera unit 130, and housing 140 in FIGS. 6, 7A, and 7B are the same as those of the elastic part 110, markers 120, camera unit 130, and housing 140 in FIGS. 1A, 1B, 2, 3, 4A, and 4B.

In FIGS. 6, 7A, and 7B, "X" may indicate the longitudinal direction of the optical tactile sensor module 100. "Y" may indicate the width direction of the optical tactile sensor module 100. "Z" may indicate the thickness direction of the optical tactile sensor module 100. Additionally, in an embodiment of the disclosure, "+X" may indicate the right direction of the optical tactile sensor module 100, and "−X" may indicate the left direction of the optical tactile sensor module 100. In an embodiment of the disclosure, "+Y" may indicate the forward direction of the optical tactile sensor module 100, and "−Y" may indicate the backward direction of the optical tactile sensor module 100. In an embodiment of the disclosure, "+Z" may indicate the upward direction of the optical tactile sensor module 100, and "−Z" may indicate the downward direction of the optical tactile sensor module 100.

According to various embodiments of the disclosure, the marker 220 may include a plurality of areas having different colors to clearly distinguish the same from external objects. For example, the markers constituting the markers 220 may include a first marker 221 including a first color, and a second marker 222 including a second color different from the first color. For example, the first marker 221 may be black. For example, the second marker 222 may be white. In the case where the marker 220 has a single color, if an external object is similar to the single color, it is difficult to detect the external object, so a plurality of colors may be used to address this issue. According to various embodiments of the disclosure, the first marker 221 may be a circular marker having a radius of a first length r1. The second marker 222 may be circular and may be shaped to exclude a portion that overlaps with the first marker 221, and may have the same center as the first circular marker 221 and a radius of a second length r2. The radius of the second length r2 of the second marker 222 may be greater than the radius of the first length r1 of the first marker 221. For example, the second marker 222 may be a donut-shaped marker, which surrounds the first marker 221, having a predetermined thickness of "second length r2−first length r1". However, the shapes of the first marker 221 and/or second marker 222 are not limited to the above embodiment and may be designed in various ways.

According to various embodiments of the disclosure, referring to FIG. 7B, if an external object (e.g., the external object P1 in FIG. 7B) approaches the first surface of the elastic part 110, the external object and the plurality of markers 220 may be displayed to overlap each other on the image captured by the camera unit 130. In this case, if at least some colors of the captured image are similar to the first color of the first marker 221, since the second color including the second color is located at the edge of the marker 220, the external object (e.g., the external object P1 in FIG. 7B) and the marker 220 may be easily distinguish, and the displacement and movement of the marker 220 may be easily measured. If at least some colors of the captured image are similar to the second color of the second marker 222, since the first marker including the first color is located at the center of the marker 220, the external object (e.g., the external object P1 in FIG. 7B) and the marker 220 may be easily distinguish, and the displacement and movement of the marker 220 may be easily measured.

Figure 8A:
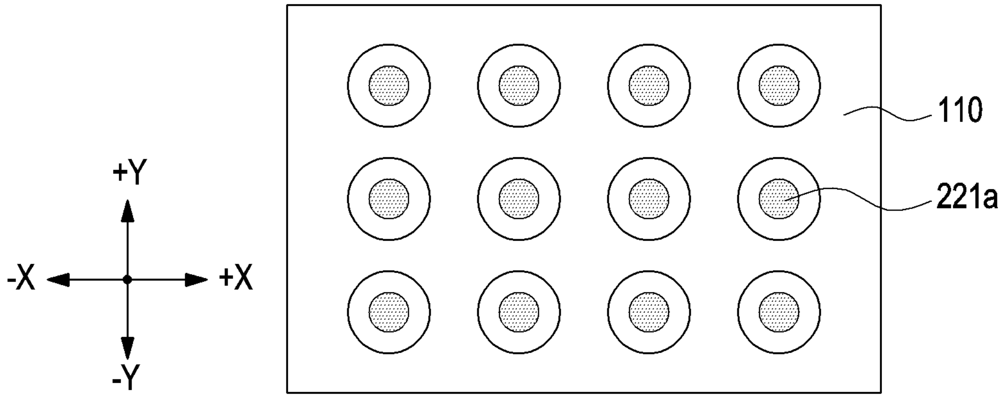
FIG. 8A is a diagram illustrating an elastic part viewed from a camera unit and markers in which color of a first marker changes to 1-a color if a measured temperature falls within a first range according to an embodiment of the disclosure.
Figure 8B:
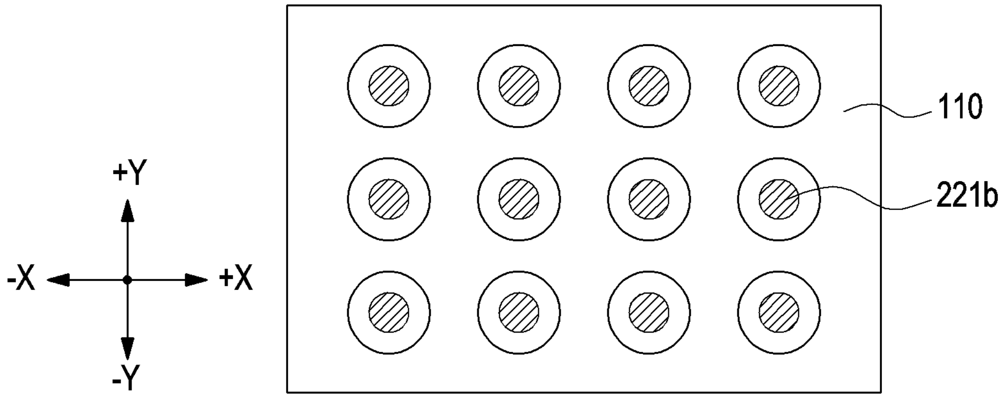
FIG. 8B is a diagram illustrating an elastic part viewed from a camera unit and markers in which color of a first marker changes to 1-b color if a measured temperature falls within a second range according to an embodiment of the disclosure.
Figure 8C:
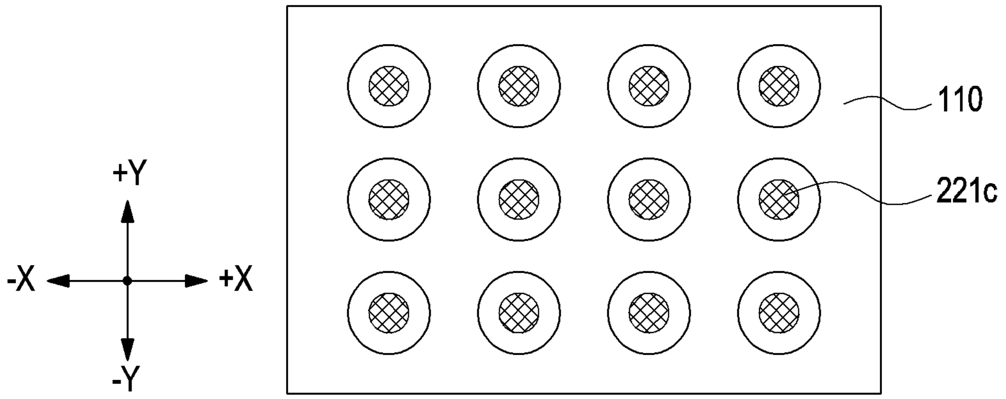
FIG. 8C is a diagram illustrating an elastic part viewed from a camera unit and markers in which color of a first marker changes to 1-c color if a measured temperature falls within a third range according to an embodiment of the disclosure.

FIG. 8A is a diagram illustrating an elastic part viewed from a camera unit and markers in which color of a first marker changes to 1-a color if a measured temperature falls within a first range according to an embodiment of the disclosure. FIG. 8B is a diagram illustrating an elastic part viewed from a camera unit and markers in which color of a first marker changes to 1-b color if a measured temperature falls within a second range according to an embodiment of the disclosure. FIG. 8C is a diagram illustrating an elastic part viewed from a camera unit and markers in which color of a first marker changes to 1-c color if a measured temperature falls within a third range according to an embodiment of the disclosure.

Figure 9:
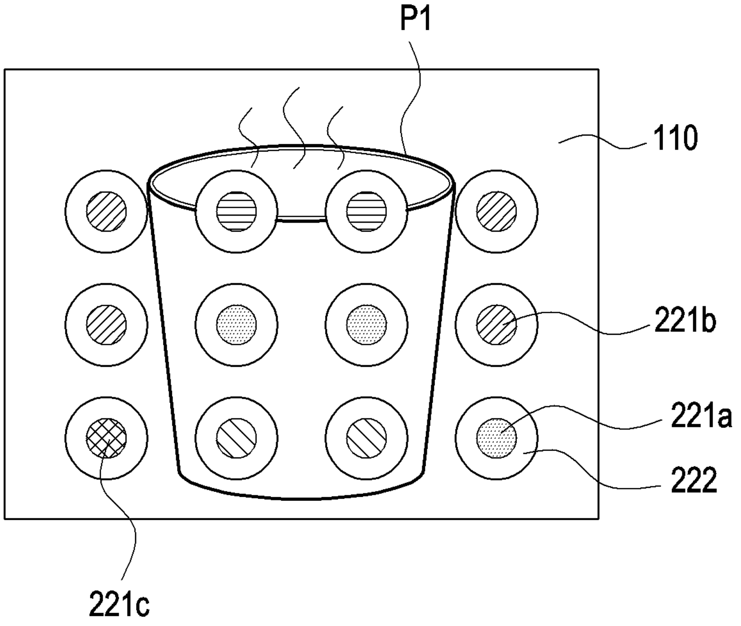
FIG. 9 is a diagram illustrating an elastic part viewed from a camera unit and a plurality of markers having different temperatures depending on locations according to an embodiment of the disclosure.

FIG. 9 is a diagram illustrating an elastic part viewed from a camera unit and a plurality of markers having different temperatures depending on locations according to an embodiment of the disclosure.

Referring to FIGS. 8A, 8B, 8C, and 9, the optical tactile sensor module 100 may include an elastic part 110 and a marker 220. All or some of the configurations of the elastic part 110 and the marker 220 in FIGS. 8A, 8B, 8C, and 9 may be the same as the configurations of the elastic part 110 and the marker 220 in FIGS. 5A and 5B.

In FIGS. 8A, 8B, 8C, and 9, "X" may indicate the longitudinal direction of the optical tactile sensor module 100. "Y" may indicate the width direction of the optical tactile sensor module 100. Additionally, in an embodiment of the disclosure, "+X" may indicate the right direction of the optical tactile sensor module 100, and "−X" may indicate the left direction of the optical tactile sensor module 100. In an embodiment of the disclosure, "+Y" may indicate the forward direction of the optical tactile sensor module 100, and "−Y" may indicate the backward direction of the optical tactile sensor module 100.

According to various embodiments of the disclosure, the first color of the first marker 221 may include a thermosensitive pigment whose color changes depending on temperature. For example, measurable temperature may be divided into a plurality of ranges, and a plurality of colors may be specified according to the ranges. Thermosensitive pigments are pigments that change their colors depending on temperature, and the color begins to disappear as the temperature rises and returns back to its original color when the temperature falls again. Thermosensitive pigments change colors at intervals of 2 to 10 degrees C. between-15 degrees C. and 70 degrees C., and there are various grades of pigments, such as pigments that change colors when the temperature rises by 2 degrees C. from 20 degrees C., pigments that change colors at 31 degrees C., 43 degrees C., and 65 degrees C., or the like. In the case of TP of 31 degrees C., which is a common thermosensitive pigment, the color disappears at 33 degrees C. and returns to the original color when the temperature is lowered to the original temperature. Specifically, the blue thermosensitive pigment (BT-20), which changes at 20 degrees C., appears blue at 20 degrees C. or less, and the color disappears at 22 degrees C. The orange thermosensitive pigment (OT-31), which changes at 31 degrees C., appears orange at 31 degrees C., and the color completely disappears at 35 degrees C. when heated. The red thermosensitive pigment (RT-43), which changes at 43 degrees C., appears red at 43 degrees C., and the color completely disappears at 47 degrees C. when heated. In addition, there are various colors of thermosensitive pigments, and different colors may be obtained through a combination of two types of thermosensitive pigments or a combination of thermosensitive pigments and regular pigments, and different products may be obtained through a combination of three or more thermosensitive pigments with different temperatures, which may meet various requirements of products depending on the development. For example, a combination of a 20 degrees C.-thermosensitive pigment, a 31 degrees C.-thermosensitive pigment, and a 43 degrees C.-thermosensitive pigment may be configured such that the color changes at 25 degrees C., changes to another color at 35 degrees C., and then changes to another color when the temperature rises 45 degrees C. or above. However, the above thermosensitive pigments are merely illustrative, and the disclosure is not limited thereto, and it is obvious to persons who are skilled in the art (hereinafter referred to as "those skilled in the art") that various commercially available thermosensitive pigments may be appropriately selected and used. In addition, although the thermosensitive pigment is selected in the temperature range of −15 to 70 degrees C., it is obvious to those skilled in the art that thermosensitive pigments may be selected in a temperature range that does not affect other elements of the optical tactile sensor module 100, considering that the first marker 221 of the marker 120 is used in the optical tactile sensor module 100.

According to an embodiment of the disclosure, referring to FIG. 8A, if a temperature in the first range is measured, the first marker 221 having the first color may change to the 1-a marker 221*a* having the 1-a color. Referring to FIG. 8B, if a temperature in the second range different from the first range is measured, the first marker 221 having the first color may change to the 1-b marker 221*b* having the 1-b color. Referring to FIG. 8C, if a temperature in the third range different from the first range and second range is measured, the first marker 221 having the first color may change to the 1-c marker 221*c* having the 1-c color. However, the temperature range in which the color changes is not limited to the above embodiment and may be designed in various ways depending on the intended use.

According to various embodiments of the disclosure, if an external object (e.g., the external object P1 in FIGS. 8A, 8B, and 8C) contacts the first surface of the elastic part 110, the measured temperature may vary depending on the location of the marker 220. According to FIG. 9, if a specified portion includes an external object (e.g., the external object P1 in FIGS. 8A, 8B, and 8C) having a specific temperature, the temperature measured in the marker 220 close to the portion may be different from the temperature measured in the marker 220 far from the portion. Therefore, by measuring the temperature depending on the location, it is possible to identify the contact of the external object (e.g., the external object P1 in FIGS. 8A, 8B, and 8C) and the contact area thereof.

An optical tactile sensor module (e.g., the optical tactile sensor module 100 in FIGS. 1A and 1B) according to various embodiments of the disclosure may include a housing (e.g., the housing 140 in FIGS. 1A and 1B), a circuit board disposed inside the housing, an elastic part (e.g., the elastic part 110 in FIGS. 1A and 1B) including a first surface (e.g., the first surface 111 in FIGS. 1A and 1B) to come into contact with an object, a plurality of markers (e.g., the plurality of markers 120 in FIGS. 1A and 1B) disposed at the elastic part and being adjacent to the first surface of the elastic part, and a camera unit (e.g., the camera unit 130 in FIGS. 1A and 1B) electrically connected to the circuit board and configured to capture an image of a movement of at least some of the plurality of markers on the first surface when the object contacts the first surface of the elastic part, wherein the markers may include a first marker (e.g., the first marker 221 in FIG. 6) including a first color, and a second marker (e.g., the second marker 222 in FIG. 6) including a second color different from the first color.

In various embodiments of the disclosure, the first marker may be a circular marker having a radius with a first length (e.g., the first length r1 in FIG. 6).

In various embodiments of the disclosure, the second marker may be formed to surround the edge of the first marker, and the outer perimeter of the second marker may form a circle having a radius with a second length (e.g., the second length r2 in FIG. 6) longer than the first length.

In various embodiments of the disclosure, the first marker may include a thermosensitive pigment.

In various embodiments of the disclosure, the first color of the first marker may change to a 1-a color if a temperature within a first range is measured, change to a 1-b color if a temperature within a second range higher than the temperature in the first range is measured, and change to a 1-c color if a temperature within a third range higher than the temperature in the second range is measured.

In various embodiments of the disclosure, the plurality of markers may be arranged at regular intervals.

In various embodiments of the disclosure, the elastic part may include an optically transparent material, such as at least one of a silicone resin and an elastomer.

In various embodiments of the disclosure, the elastic part may include an optically translucent material.

In various embodiments of the disclosure, the markers and the object may be shown in the image captured by the camera unit.

In various embodiments of the disclosure, the movement of the marker may include at least one of displacement, deformation, or tilt of the marker.

In various embodiments of the disclosure, a connection part to be connected to an external electronic device may be further included.

In various embodiments of the disclosure, the external electronic device may be an industrial robot.

An electronic device according to various embodiments of the disclosure may include an optical tactile sensor module and a circuit board electrically connected to the optical tactile sensor module, wherein the optical tactile sensor module may include a housing, an elastic part including a first surface to come into contact with an object, a plurality of markers disposed on the first surface of the elastic part, and a camera unit configured to capture movements of at least some of the markers when the object contacts the first surface of the elastic part, wherein the markers may include a first marker including a first color, and a second marker including a second color different from the first color.

In various embodiments of the disclosure, the first marker may be a circular marker having a radius with a first length.

In various embodiments of the disclosure, the second marker may be formed to surround the edge of the first marker, and the outer perimeter of the second marker may form a circle having a radius with a second length greater than the first radius.

In various embodiments of the disclosure, the first marker may include a thermosensitive pigment.

In various embodiments of the disclosure, the first color of the first marker may change to a $1a^{th}$ color if a temperature in a first range is measured, change to a $1b^{th}$ color if a temperature in a second range higher than the temperature in the first range is measured, and change to a $1c^{th}$ color if a temperature in a third range higher than the temperature in the second range is measured.

In various embodiments of the disclosure, the plurality of markers may be arranged at regular intervals.

In various embodiments of the disclosure, the elastic part may include an optically transparent material, such as at least one of a silicone resin and an elastomer.

In various embodiments of the disclosure, the elastic part may include an optically translucent material.

The optical tactile sensor (e.g., the optical tactile sensor module 100 in FIGS. 1A and 1B) of various embodiments of the disclosure described above is not limited to the above-described embodiments and drawings, and it will be obvious to those skilled in the art to which the disclosure pertains that various modifications, substitutions, and changes are possible within the scope of the disclosure.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. Optical tactile sensor circuitry comprising:

a housing;

an elastic part comprising a first surface for contacting an object;

a plurality of markers disposed on a same plane of the elastic part and being adjacent to the first surface of the elastic part; and a camera configured to capture an image of a movement of at least some of the plurality of markers on the first surface when the object contacts the first surface of the elastic part, wherein each marker of the plurality of markers comprises:

a first marker comprising a first color, and a second marker surrounding an edge of the first marker and comprising a second color different from the first color.

2. The optical tactile sensor circuitry of claim 1, wherein the first marker is a circular marker having a radius of a first length.

3. The optical tactile sensor circuitry of claim 2, wherein an outer perimeter of the second marker forms a circle having a radius of a second length longer than the first length.

4. The optical tactile sensor circuitry of claim 1, wherein the first marker comprises a thermosensitive pigment.

5. The optical tactile sensor circuitry of claim 1, wherein the first color of the first marker is configured to:

change to a 1-a color in case that a temperature within a first range is measured;

change to a 1-b color in case that a temperature within a second range higher than the first range is measured; and change to a 1-c color in case that a temperature within a third range higher than the second range is measured.

6. The optical tactile sensor circuitry of claim 1, wherein the plurality of markers are arranged with at least one specified interval.

7. The optical tactile sensor circuitry of claim 1, wherein the elastic part comprises an optically transparent material.

8. The optical tactile sensor circuitry of claim 1, wherein the first surface of the elastic part is optically translucent.

9. The optical tactile sensor circuitry of claim 1, wherein the plurality of markers and the object are shown in the image captured by the camera.

10. The optical tactile sensor circuitry of claim 1, wherein the movement of the at least some of the plurality of markers comprises at least one of displacement, deformation, or tilt of the at least some of the plurality of markers.

11. The optical tactile sensor circuitry of claim 1, further comprising:

a connection part configured to be connected to an external electronic device.

12. The optical tactile sensor circuitry of claim 11, wherein the external electronic device includes a robot.

13. An electronic device comprising:

optical tactile sensor circuitry; and a circuit board electrically connected to the optical tactile sensor circuitry, wherein the optical tactile sensor circuitry comprises:

a housing, an elastic part comprising a first surface for contacting an object, a plurality of markers arranged on a same plane of the first surface of the elastic part, and a camera configured to capture an image of a movement of at least some of the plurality of markers when the object contacts the first surface of the elastic part, and wherein each marker of the plurality of markers comprises:

a first marker comprising a first color, and a second marker surrounding an edge of the first marker and comprising a second color different from the first color.

14. The electronic device of claim 13, wherein the first marker is a circular marker having a radius of a first length.

15. The electronic device of claim 14, wherein an outer perimeter of the second marker forms a circle having a radius of a second length longer than the first length.

16. The electronic device of claim 13, wherein the first marker comprises a single first color and the second marker comprises a single second color, wherein the single first color of the first marker is black, and wherein the single second color of the second marker is white.

17. The electronic device of claim 13, wherein the first marker is circular is shape, and wherein the second marker is a donut-shaped marker on the same plane as the first marker and having a predetermined thickness surrounding the first marker.

* * * * *